(12) United States Patent
Newman

(10) Patent No.: US 6,722,014 B2
(45) Date of Patent: Apr. 20, 2004

(54) ENERGIZED SEQUENTIAL TOOL COATING

(75) Inventor: David P. Newman, Fort Morgan, CO (US)

(73) Assignee: Camax Tool Company, Inc., Fort Morgan, CO (US)

( * ) Notice: Subject to any disclaimer, the term of this patent is extended or adjusted under 35 U.S.C. 154(b) by 11 days.

(21) Appl. No.: 10/197,770

(22) Filed: Jul. 18, 2002

(65) Prior Publication Data

US 2003/0017016 A1 Jan. 23, 2003

Related U.S. Application Data

(60) Provisional application No. 60/306,709, filed on Jul. 20, 2001.

(51) Int. Cl.[7] .............................. B23P 6/00; B23P 17/00; B05C 5/02; B05D 1/26
(52) U.S. Cl. ..................... 29/527.2; 29/402.18; 29/56.5; 407/119; 409/131; 409/136; 408/56; 427/388.1; 427/421; 118/642
(58) Field of Search .................. 29/402.18, 402.19, 29/402.21, 527.1, 527.2, 527.4, 56.5; 407/119; 409/131, 136, 135; 408/56, 61, 57, 59, 60; 427/388.1, 388.4, 388.5, 421, 425; 118/641, 642

(56) References Cited

U.S. PATENT DOCUMENTS 4,266,449 A * 5/1981 Bielby ....................... 407/119
6,370,165 B1 * 4/2002 Badzian et al. ................ 372/7

FOREIGN PATENT DOCUMENTS

| JP | 3-150345 A | * | 6/1991 |
| JP | 6-114676 A | * | 4/1994 |
| WO | WO-99/00534 A1 | * | 1/1999 |

OTHER PUBLICATIONS

Arnell et al., "Tribology, Principles and Design Applications", 1993, The MacMillan Press, Ltd., pp. 122–123.*

* cited by examiner

Primary Examiner—Erica Cadugan
(74) Attorney, Agent, or Firm—Joseph G. Nauman

(57) ABSTRACT

In a machining sequence a flow of coating fluid is applied, such as through a nozzle, to wet at least the cutting surface of a tool to be engaged with a part to perform a machining operation thereon. The fluid is applied quickly and dried or cured to form an adherent coating layer on the tool. Propylene glycol is an example of a suitable fluid. After the tool is wetted an energy source is placed in appropriate proximity to the wetted tool The energy source is energized to heat the tool, thereby raising its surface temperature sufficiently to dry the coating layer. This process, and the apparatus performing it, can be incorporated into the machining operation and the tool coating can be refurbished in situ, on a regular basis, before or after a machining operation as appropriate.

12 Claims, 1 Drawing Sheet

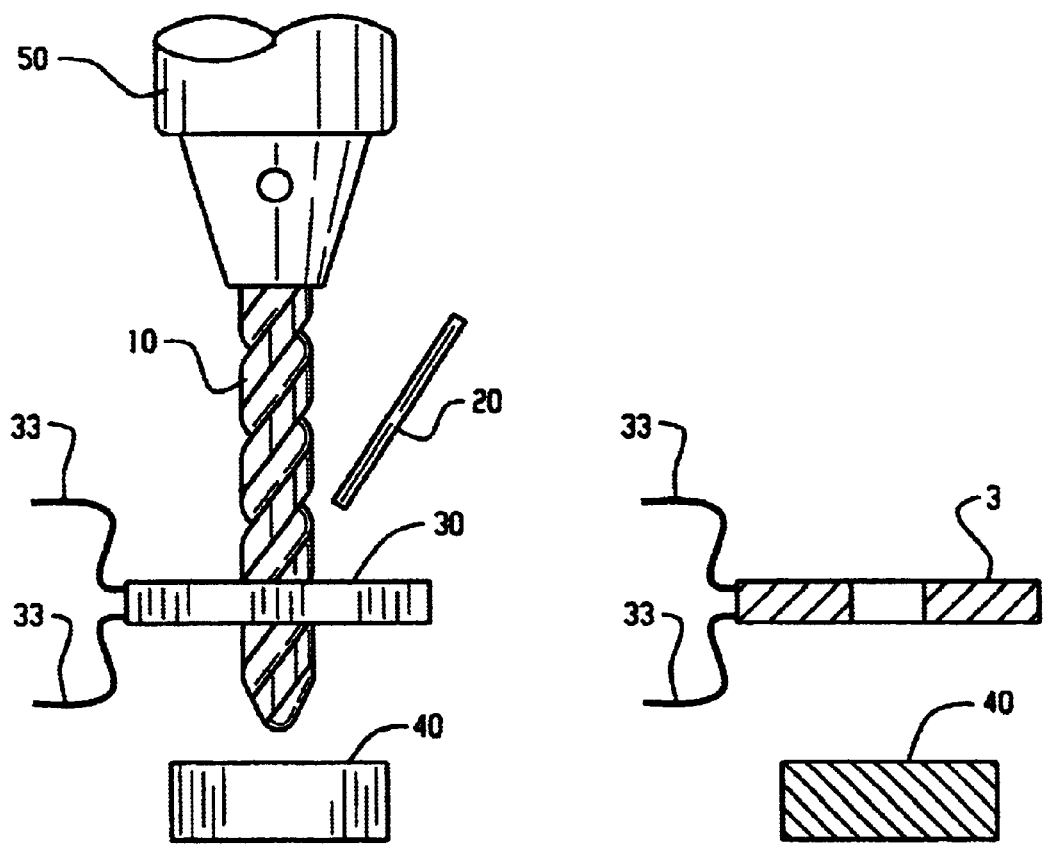
Fig. 1
Fig. 3
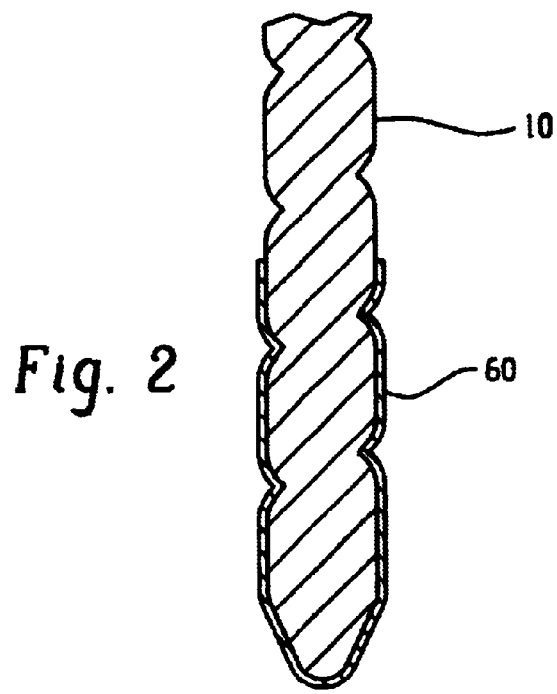
Fig. 2

ENERGIZED SEQUENTIAL TOOL COATING

RELATED APPLICATION

This application is based upon, and claims priority of, Provisional Application Ser. No. 60/306,709 filed Jul. 20, 2001.

BACKGROUND OF THE INVENTION

A. Field of Invention

This invention relates to coated machining tools such as drills, taps and milling cutters for metal forming and removal. Coating refers to the formation of a dry adherent or bonded layer on the surface of the tool. In particular, this invention pertains to the use of an energy source in forming a coating on the tool surface as a step in the machining sequence.

B. Prior Art

A basic machining sequence is used for the repetitive formation of drilled or threaded holes, or other machined formations (cuts), in a batch of parts, employing the use of a drill bit, or a tap, or a milling tool, or a broaching tool. For example, in a typical production sequence a part blank is fixed into position and a rotating drill or tap, or both, operates on the part to form certain required hole geometry or other machining operation. This tool is then retracted, the completed part replaced with another, and the drilling or tapping operation repeated. Although these steps comprise the basic machining sequence for batch machining, this simple process and the tools themselves can be augmented in many ways to accommodate specific aspects of a particular job. For example, depending upon the part material and desired operational speed, machining it can be a very abrasive and high friction operation, resulting in rapid tool wear and potential part or tool damage.

A large industry has grown up involved with improving tool performance and life. There is a great variety of machining fluids available to cool and lubricate during the machining process. Also, tools are available with a variety of specialty coatings applied during or after their manufacture for enhancing performance and tool life. It is observed in many situations that tool coatings out perform the sole use of 'cutting' fluids, at least because an adherent or bonded coating is much more difficult to displace from the working tool surface than a fluid. For example, one can purchase drills, taps, and milling tools, etc. with no coating, with a titanium nitride coating ("TiN"), a titanium aluminum nitride coating ("TiAlN"), a boron carbide coating ("BC"), etc. Depending upon the material being machined and speed desired, these fluids and coatings can dramatically improve the operation.

However, coated tools are typically more expensive than uncoated tools, and the additional processing required to produce them can reduce availability, sometimes adding several days or (occasionally) weeks to delivery times. Even with coated tools, the machining process remains inherently abrasive, and tool coating durability becomes an issue. For example, a new TiN coated drill or tap may produce a perfectly acceptable result in a stainless steel part, at a particularly acceptable torque and speed, with excellent completed surface finish. However, as the number of holes completed by this tool increases, its coating wears, resulting in declining part quality. Also, the required torque increases until it is too high for the tool to sustain, risking tool breakage. Of course, besides the cost of the tool itself and parts scrapped, changing tools because of coating wear is also costly in downtime. What is needed is an apparatus and method to address the difficulties associated with tool coating wear.

SUMMARY OF THE INVENTION

The invention disclosed herein relates to a method of, and apparatus for, coating a machining (e.g. cutting tool) tool in a machine tool device, such as a lathe, drill, or milling machine. The primary object of this invention is to provide an apparatus and method which addresses and minimizes the difficulties associated with wear of machining tool coatings by refurbishing the tool coating on a regular basis, as often as in each machining cycle. Further objects and advantages are to provide such refurbishing apparatus and method which are easy to use, low in cost, and rapid in operation. Additional objects and advantages will become apparent from a consideration of the ensuing description and drawings.

BRIEF DESCRIPTION OF THE DRAWINGS

FIG. 1 is an illustration of the preferred embodiment of the present invention;

FIG. 2 shows a cross-section of a tool with a coating layer, according to the present invention; and FIG. 3 shows cross sections of components of the present invention.

DESCRIPTION OF PREFERRED EMBODIMENT

The preferred embodiment of the present invention is illustrated in FIGS. 1–3. Tool 10 is a drill (or other cutting or machining tool) mounted in tool driver 50, in this case a drill chuck. It is positioned above object 40 to be machined (e.g. a work piece to be drilled or tapped, etc.). Fluid nozzle 20 is positioned to direct a flow of a fluid substance including a coating component onto tool 10. Energy source 30 may conveniently be an electrical induction ring 32, connected through conductors 33 to a suitable power source, which ring may be positioned around tool 10 near its tip. Other energy sources may be utilized depending upon the available energy supplies and the particular requirements of the surroundings. FIG. 3 illustrates cross-sections of the induction ring 32 and object 40.

In a machining sequence of the present invention, a flow of the fluid substance through fluid nozzle 20 wets tool (10) at least over the surface (such as a cutting surface) to be engaged with the object or part 40 in the machining operation. This fluid is specially chosen to include a coating component as a feature of this invention. Its properties include the ability to be applied efficiently and quickly, and dried or cured to form an adherent or bonded coating layer 60 of the component on tool 10. In a preferred embodiment of the invention, propylene glycol is used as a fluid. After the tool is wetted, energy source 30 is placed in appropriate proximity to the wetted tool 10 for example surrounding tool 10 as shown in FIG. 1. The energy source 30 is energized to inductively heat the tool end, thereby raising its surface temperature sufficiently to dry the coating layer 60 resulting from deposit of (essentially) polypropylene onto the tool surface. FIG. 2. illustrates a cross-section of tool 10 with applied coating layer 60.

Thereafter, the induction ring energy source 30 is de-energized, and tool driver 50 drives the coated tool 10 into or against (as the case may be) object 40 forming the desired machined geometry. Upon completion the tool is retracted from the object and a new object is positioned therein. The tool is freshly wetted with the fluid, the induction ring is again located about the tool (in some instances the ring may be kept in place and the tool moved within the ring), then energized and a new coating formed, as of (principally) polypropelene. The energy source ring 30 is de-energized and the next part is machined.

In this manner, the tool acquires a new coating before every machining operation. Little additional time is required for the coating cycle. Tool coating wear is not cumulative, as it is refreshed as a step in every machining cycle, and tool life is significantly improved. If refurbishing the tool coating during every machining cycle is not necessary, the process can be performed after some selected multiple of machining operations.

Alternative fluids and coating processes may be employed without departing from the scope of this invention. For example, the energy source may be a flame or laser, and the fluid may be chosen from a variety of materials that can be caused to leave a performance enhancing layer adherent or bonded to the tool surface. The energy source may be other than thermal, for example optical laser beam. Furthermore, in some machining operations it may be determined that the coating step will serve best when activated intermittently rather than during every machining cycle. Also, the method and apparatus can be used with tools having a prior coating, contributing to the durability of that surface. The present invention is not limited to cutting drills or taps, and may be applied to other cutting or forming tools such as milling cutters, burnishing tools, and tools which displace rather than cut a surface of a part.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

Reference Numerals in Drawings

10 Tool
20 Fluid Nozzle
30 Energy Source
32 Electrical Induction Ring
33 Electrical supply Conductors
40 Object (e.g. workpiece to be machined)
50 Tool Driver
60 Coating Layer

What is claimed is:

1. In a method of machining in which a tool is applied to a workpiece and caused to perform a machining operation thereon via a tool driver, the improvement comprising
    applying to the tool, while the tool is held by the tool driver, a substance including a component to be deposited as a wear-resistant coating on the tool surface, and
    employing an energy source to deposit the component as an adherent coating on the surface of the tool prior to performing the machining operation.

2. A method as defined in claim 1 in which the energy source provides thermal energy to the tool and the applied substance to cause the component to precipitate from the substance onto the surface of the tool.

3. A method as defined in claim 2, wherein the energy source is an electrically energized induction member.

4. A method as defined in claim 2 in which the energy source is an optical energy source.

5. A method as defined in claim 4 in which the optical energy source is a laser.

6. A method as defined in claim 1 in which the tool is a cutting tool.

7. A method as defined in claim 6 in which the cutting tool is a drill, a tap, and/or a milling cutter, and the wear-resistant coating is a hardened coating.

8. A method as defined in claim 1 in which the applied substance is propylene glycol.

9. In a machining apparatus having a tool holder which is adapted to support and drive a machining tool in a machining operation to act upon a work piece, the improvement comprising
    a supply nozzle directed toward the tool in the tool holder which applies a flowable substance containing a component to be deposited as a wear-resistant coating onto a predetermined area of the tool,
    an energy source supported adjacent the tool holder and constructed and arranged to impart energy to the tool and the substance applied thereto so as to cause adherent deposition of the component onto the tool, and
    means for controlling said nozzle and said energy source through a cycle wherein a quantity of the substance is applied to the tool, energy is transferred to the tool and the substance thereon, and the component is deposited onto the tool, between machining cycle operation of the machining apparatus.

10. A device as defined in claim 9, in which the tool is a milling cutter.

11. A device as defined in claim 9, in which the machining apparatus is a power driven drilling machine.

12. A device as defined in claim 9, in which the tool is a tap tool.

* * * * *